United States Patent [19]

Hawkins, Jr.

[11] 4,147,217

[45] Apr. 3, 1979

[54] FOLDABLE HARROW

[76] Inventor: Columbus W. Hawkins, Jr., Route 3, Box 165, Oak Grove, La. 71263

[21] Appl. No.: 832,334

[22] Filed: Sep. 12, 1977

[51] Int. Cl.² ............................................. A01B 73/00
[52] U.S. Cl. ................................... 172/662; 172/456; 172/502; 172/620
[58] Field of Search ............... 172/311, 456, 618, 620, 172/662, 488, 489, 501, 502, 629

[56] References Cited

U.S. PATENT DOCUMENTS

| 164,713 | 6/1875 | Brodrick | 172/620 |
|---|---|---|---|
| 409,233 | 8/1889 | Powell | 172/620 |
| 779,520 | 1/1905 | Bloom | 172/618 |
| 1,029,154 | 6/1912 | Townsend | 172/620 |
| 1,099,290 | 6/1914 | Fitzgerald | 172/200 |
| 1,299,553 | 4/1919 | Collins | 172/620 |
| 2,926,929 | 3/1960 | Doepker | 172/456 |
| 3,255,831 | 6/1966 | Kirkpatrick, Jr. | 172/611 |
| 3,593,858 | 7/1971 | Ruffin | 212/8 |
| 3,613,801 | 10/1971 | Roth | 172/456 |
| 3,866,689 | 2/1975 | Anderson | 172/311 |

FOREIGN PATENT DOCUMENTS

| 293165 | 4/1967 | Australia | 172/620 |
|---|---|---|---|
| 1256464 | 12/1967 | Fed. Rep. of Germany | 172/456 |
| 424522 | 9/1974 | U.S.S.R. | 172/662 |

Primary Examiner—Richard T. Stouffer
Attorney, Agent, or Firm—John F. Sieberth

[57] ABSTRACT

The device includes (i) a supporting frame for connection to a draft source, this frame having a plurality of laterally positioned rigid supporting sections each hinged to its laterally adjacent section; (ii) a plurality of working sections corresponding to the respective supporting sections, the working sections each comprising (a) tandemly positioned transverse harrow bars secured together for independent vertical and pivotal motion with respect to each other, and (b) downwardly disposed harrow teeth secured to the harrow bars; and (iii) connectors flexibly securing the working sections to their corresponding supporting sections so that when in harrowing position a working section underlies its supporting section. At least one of the outboard supporting sections together with its working section can be rotated as a unit around a longitudinal axis between prone and upstanding positions.

3 Claims, 9 Drawing Figures

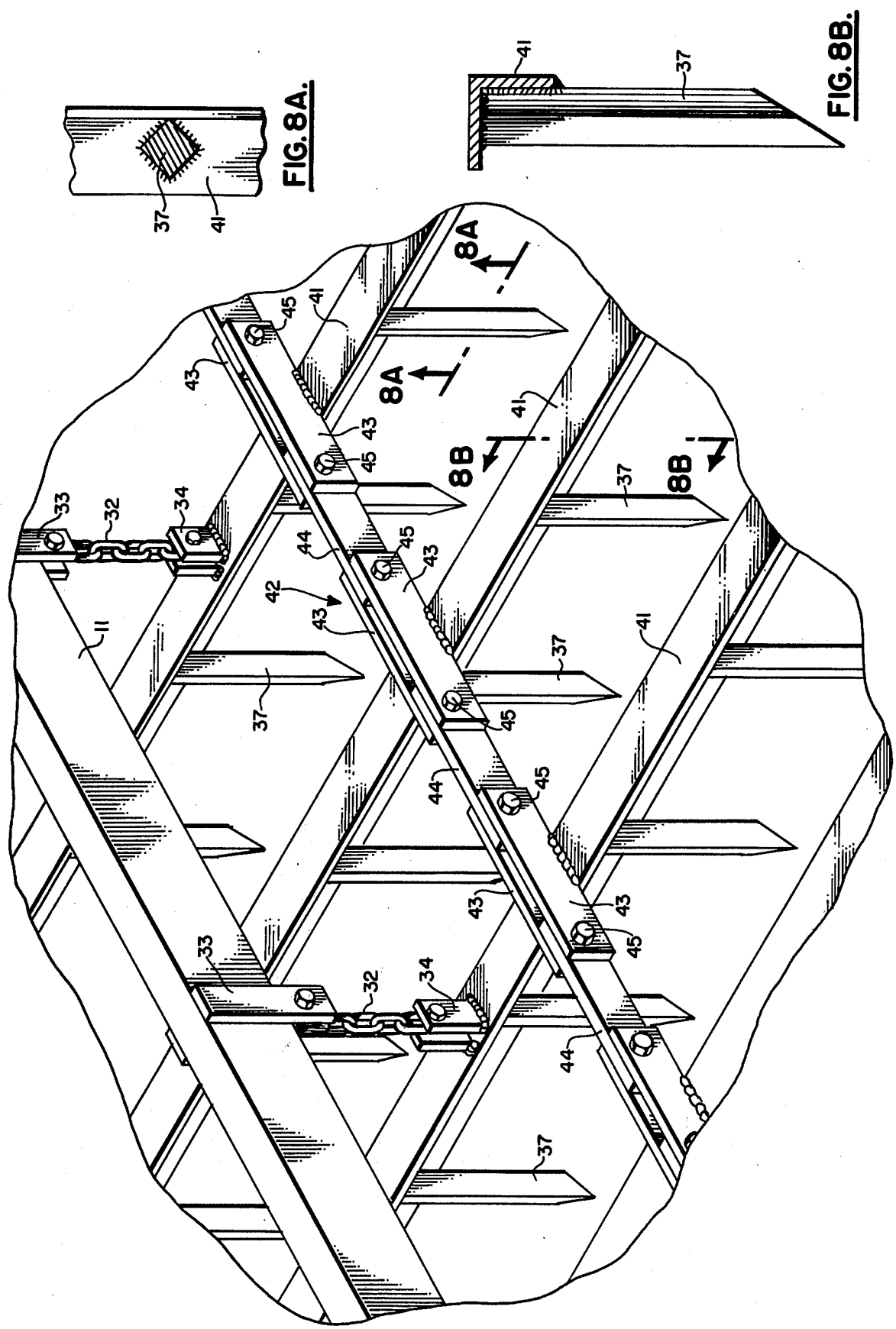

FOLDABLE HARROW

This invention relates to agricultural implements for working the soil, and more particularly to a compact harrow or ground conditioner which can be readily transported and operated by the tractor or other suitable mechanical draft source with which it is employed.

In order to gain an appreciation of the features, advantages and characteristics of this invention, reference should be had to the following description taken in conjunction with the accompanying drawings wherein like reference numerals are used to designate like parts, and wherein.

Figure 1:
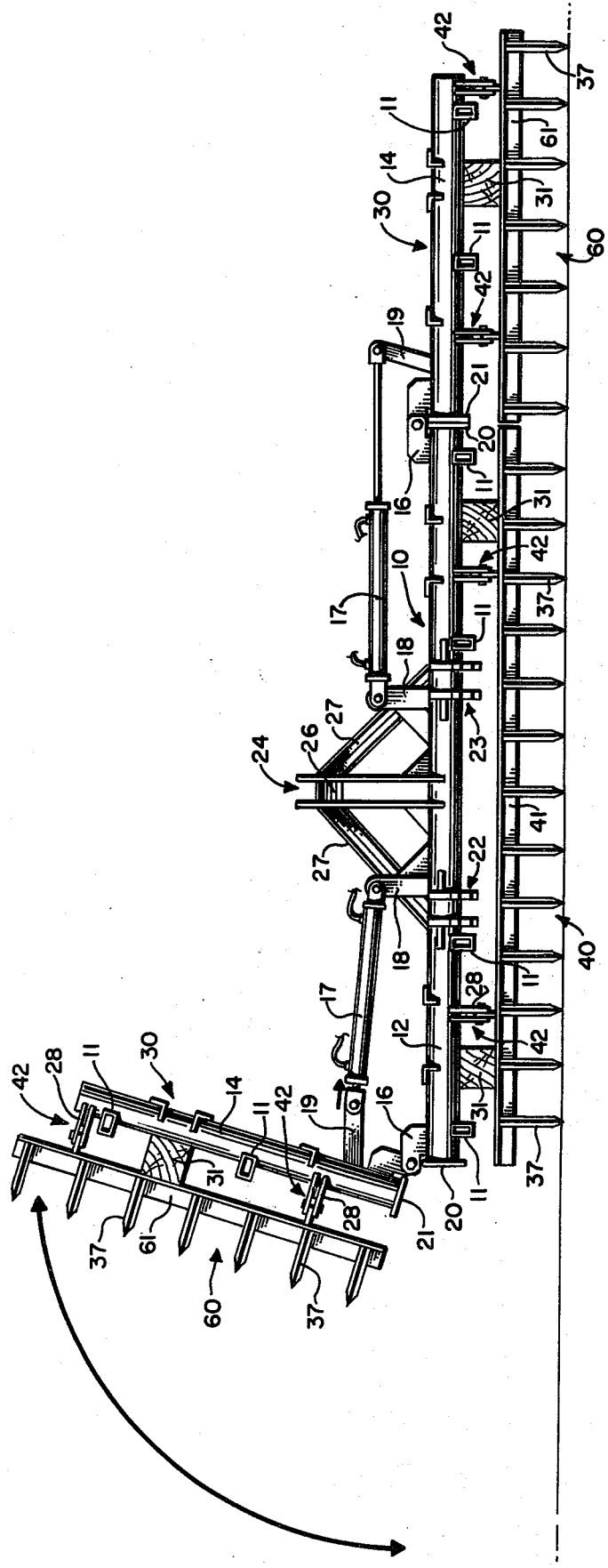
FIG. 1 is a front elevational view of a preferred foldable harrow of this invention depicted with one of its outboard sections rotated into an upstanding position and the other in a prone position.
Figure 2:
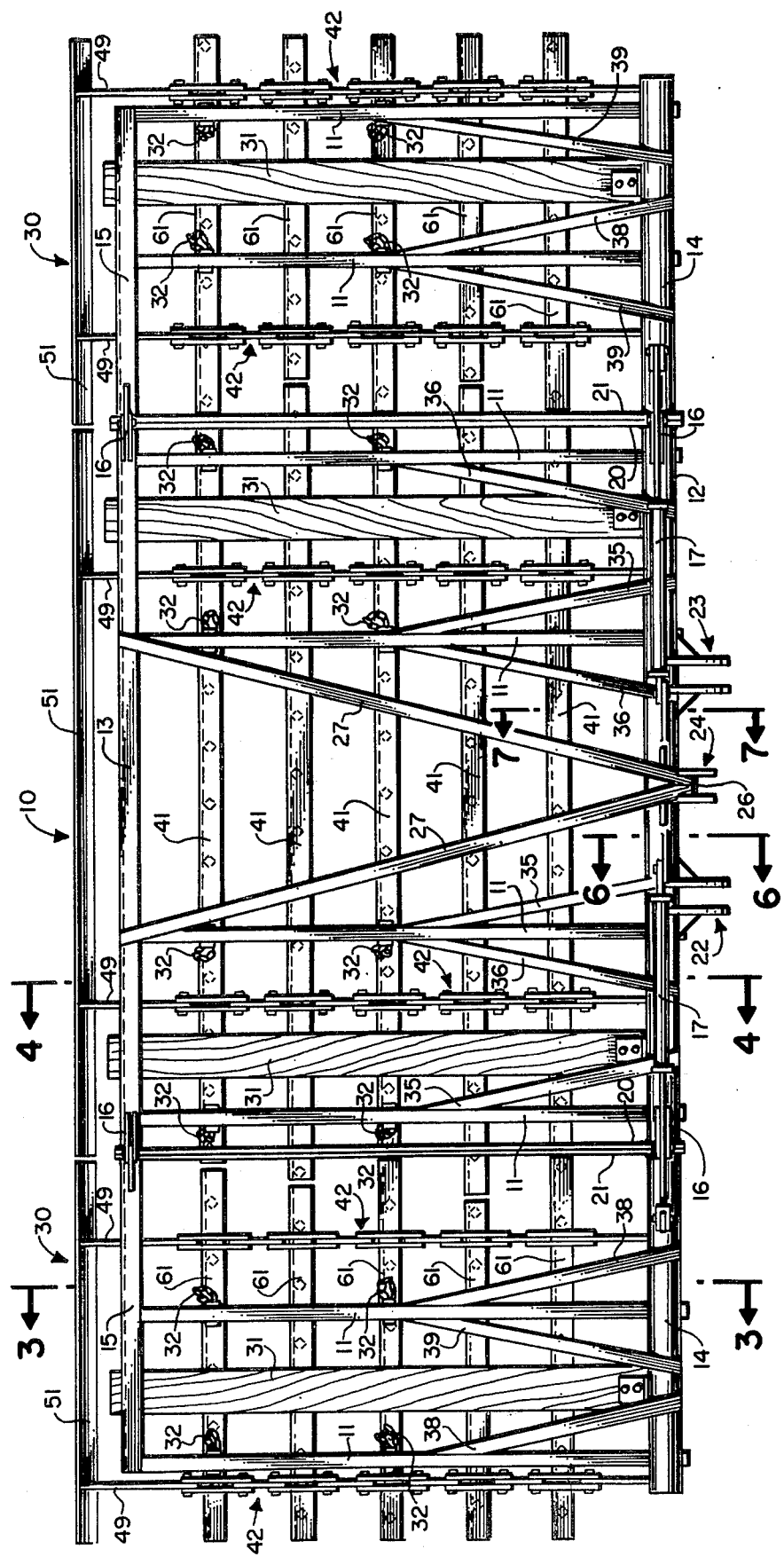
FIG. 2 is a top plan view of the harrow of FIG. 1 wherein both outboard sections of the device are in prone positions.
Figure 3:
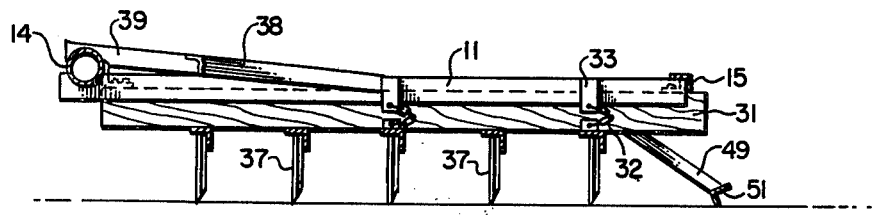
FIG. 3 is a vertical section taken along line 3—3 of FIG. 2 depicting the parts as they are positioned when the harrow rests upon the ground or other flat underlying surface.
Figure 4:
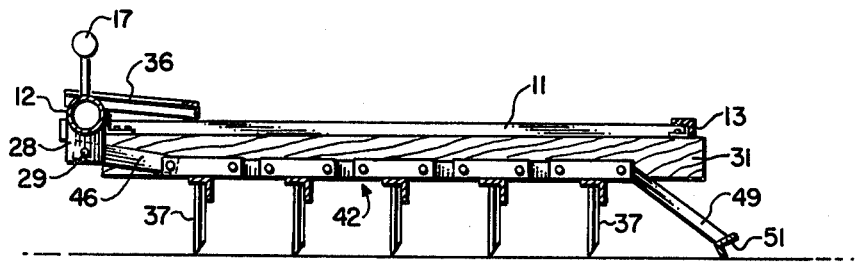
FIG. 4 is a vertical section taken along line 4—4 of FIG. 2 likewise depicting the parts as they are positioned when the harrow rests upon the ground or other flat underlying surface.

FIG. 8 is an enlarged fragmentary view in perspective showing some of the details of construction of the harrow depicted in FIGS. 1-7 inclusive; and FIG. 8A is a fragmentary view looking upwards along line 8A—8A of FIG. 8 showing one of the harrow teeth in cross-section and illustrating its mode of attachment to the harrow bar, whereas FIG. 8B is a fragmentary side view looking along line 8B—8B of FIG. 8 showing one of the harrow teeth in side elevation and also illustrating its mode of attachment to the harrow bar.

In accordance with this invention, a harrow device is provided which includes (i) a supporting frame adapted to be connected to a draft source, the supporting frame having a plurality of laterally positioned rigid supporting sections, each hinged to its laterally adjacent section; (ii) a plurality of working sections corresponding to the respective supporting sections each comprising (a) a plurality of tandemly positioned elongate transverse harrow bars secured together for independent vertical and pivotal motion with respect to each other, and (b) a plurality of downwardly disposed harrow bars; and (iii) connecting means flexibly securing the working sections to their corresponding supporting sections so that when a working section is in harrowing position it underlies its corresponding supporting section. The device is further characterized in that at least one of the outboard supporting sections together with its corresponding working section can be rotated as a unit around a longitudinal axis between prone and upstanding positions. In preferred form the device further includes means on said outboard supporting section and means on its laterally adjacent supporting section for mounting therebetween linearly extendible/retractable driving means, e.g., fluid actuated driving means such as a double acting hydraulic cylinder, for effecting such rotation.

Normally the device will have two, and preferably, three sections in the supporting frame and a like number of working sections, although other variations along these lines are entirely possible.

In the preferred system wherein the supporting frame is composed of three sections—i.e., an inboard section and two outboard sections, one on each side of the inboard section—it is desirable to include two linearly extendible/retractable driving means, one being connected between the inboard section and one of the outboard sections and the other between the inboard section and the second outboard section. In this way, either or both of the outboard sections together with their respective working sections may be rotated, either individually or simultaneously as desired, around their respective longitudinal axes between prone and upstanding positions. It is also preferred to include in the harrow device attachment means for receiving a linearly extendible/retractable driving means mounted on the tractor or other suitable mechanical draft source so that the entire harrow device may be rotated around a transverse axis in proximity to the forward end of the device. Hence in the above-mentioned preferred system wherein there are three sections in the supporting frame, this attachment means is most preferably mounted on the upper forward end of the inboard section. In such a case the lower forward end of the inboard section is pivotally attachable to the tractor or other mechanical draft source.

Another preferred embodiment of this invention involves including butt plates positioned between and carried by the respective laterally adjacent hinged-together sections of the supporting frame, these butt plates being in registration when the laterally adjacent sections are in prone position. The weight or mass of the outboard section of the supporting frame and its underlying working section will in many cases be sufficient to maintain this outboard unit in suitable working contact with the soil during harrowing. Nevertheless the inclusion and utilization of the linearly extendible/retractable driving means between the adjacent sections of the supporting frame offers the further advantage of keeping the supporting frame rigid during the harrowing operation so that the outboard unit will resist upward rotational movement. In short, by including in the harrow implement a double acting hydraulic cylinder or the like connected between the respective laterally adjacent sections of the supporting frame, not only can the outboard sections be quickly and easily raised and lowered as desired, but the entire supporting frame can be kept rigid while in the prone position during use without the need for applying clamps or other connecting devices.

In yet another preferred embodiment the harrow device includes a three point hitch assembly for operatively mounting the device on the tractor or other mechanical draft source. Such hitch assembly comprises an upstanding member adapted to be pivotally linked to a linearly extendible/retractable driving means mounted on the tractor or the like, and a pair of laterally positioned pivotal hitch assemblies adapted to operatively engage the lifting arms of the tractor or the like. This pair of hitch assemblies is preferably mounted on the forward end of the supporting frame on a transverse member thereof so that the pair of hitch assemblies are equally spaced on opposite sides of the median plane of the harrow. The upstanding member is likewise preferably mounted toward the forward end of the supporting frame so that it is in the median plane of the harrow and its pivotal linkage occurs at a higher elevation than that of the lateral pair of hitch assemblies. Rigid elongate brace members preferably fan out rearwardly and downwardly from the upper portion of the upstanding member to one or more rearward transverse members of the supporting frame, the rearward connections occurring on opposite sides of the median plane of the harrow to transverse members of a static section—i.e., an inboard or other section which does not undergo the rotation around the longitudinal axis between prone and upstanding positions.

Among the advantages of this invention are the compactness of the harrow and the ease with which it may be attached to, transported by and utilized with conventional farm tractors or the like. Further, during use its position and orientation relative to the soil can be easily and quickly adjusted where such is found necessary or desirable. In addition the device of this invention is readily fabricated at reasonable cost from readily-available parts and materials. It is durable and requires only nominal care and maintenance.

Referring now more particularly to the drawings which depict a harrow embodying a combination of preferred features of this invention, the supporting frame is made up of an inboard section designated generally by the numeral 10 and two outboard sections each designated generally by the numeral 30. Inboard section 10 includes longitudinal members 11 connected together at their front end portions by frontal member 12 and at their rearward end portions by cross member 13. In each of the outboard sections 30 additional longitudinal members 11 are connected together at their front end portions by an outboard frontal member 14 and at their rearward end portions by an outboard cross member 15. Longitudinal pivotal connection between inboard section 10 and its respective outboard sections 30 is afforded by upstanding front and rear hinges 16 so that outboard sections 30 can be rotated back and forth between upstanding positions (note the left side portion of FIG. 1) and prone positions (note the right side portion of FIG. 1). To effect this rotation by mechanical means, double acting hydraulic cylinders 17 are pivotally mounted on either side of the device between an upstanding support bar 18 and an upstanding handle bar 19, the support bars 18 being secured to frontal member 12, and one of the upstanding handle bars 19 being secured to each one of the outboard frontal members 14. As can be seen from FIG. 1 the handle bars 19 are desirably mounted so they are upwardly inclined outwardly toward the proximate side of the device so that the upward and downward rotation of the outboard sections 30 about the longitudinal axis of hinges 16 can be effected to the desired extent and in the desired direction. Actuation of the hydraulic cylinders 17 by conventional means (not shown) enables them either to extend linearly whereby the rotational force and motion are toward the prone position or to retract linearly whereby the rotational force and motion are toward the upstanding position.

A butt plate 20 is secured in vertical position to the outward end portions of members 12 and 13 and a butt plate 21 is secured to the inward end portions of members 14 and 15. Registration between butt plates 20 and 21 limits the extent of the downward rotational travel of the outboard sections 30. In addition, force applied by the hydraulic cylinders 17 against their respective support and handle bars 18 and 19 forces and maintains butt plates 20 and 21 in registration with end other so that under these conditions the entire supporting frame when in its fully extended position has lateral rigidity.

Secured to the forward edge of frontal member 12 is a lateral two point hitch assembly composed of two pairs of spaced apart lugs 22, 23 whose apertures 55 are laterally aligned to receive pivot bolts (not shown). This enables pivotal connection of the supporting frame to the conventional lifting arms (not shown) of tractors and like mechanical draft sources.

A laterally aligned pair of elongate lugs 24 is secured to the upper median portion of frontal member 12 so as to project upwardly and forwardly therefrom. Lugs 24 have, near their outward terminus, a laterally aligned pair of apertures 25 to receive a pivot bolt (not shown) for effecting connection to a double acting hydraulic cylinder (not shown) mounted on the tractor or other mechanical draft source. A cross brace 26 is secured between the pair of lugs 24 near their outward terminus. Also secured to the lugs 24 near their outward terminus are a pair of brace members 27 which extend rearwardly, downwardly and divergently to cross member 13 to which their back end portions are secured.

It will thus be seen that the pairs of lugs 22, 23 and 24 serve as a three point hitch assembly enabling the entire supporting frame to be attached to, raised and lowered by, and propelled by the tractor and its attendant equipment. In addition application of a forwardly directed pulling force to lugs 24 by means of the double acting hydraulic cylinder of the tractor enables the supporting frame to be tilted so that the back end is higher than the front end whereas the opposite tilting can be achieved by applying a rearwardly directed pushing force to lugs 24 by means of the hydraulic cylinder. Thus lugs 24 serve the role of a lever as well as a hitch assembly.

For additional strength and support, brace members 35 and 36 are angularly disposed and secured on inboard section 10 by attachment near their end portions to frontal member 12 and individual longitudinal members 11. Brace members 38 and 39 are similarly disposed and secured on the outboard sections 30, in this case the forward end portions of the braces being secured to frontal members 14.

The harrow device illustrated in the drawings has three working sections, an inboard working section designated generally by the numeral 40 and a pair of outboard working sections each designated generally by the numeral 60. Inboard section 40 includes transverse harrow bars 41 joined together near their respective end portions by longitudinal linkages designated generally by the numeral 42. In each of the outboard working sections 60 transverse harrow bars 61 are joined together near their respective end portions by additional longitudinal linkages 42. In the form depicted, bars 41 and 61 are formed from appropriate lengths of angle iron and linkages 42 comprise segments 43 welded on their edge portions in laterally spaced pairs to the tops of bars 41 and 61 (as the case may be) so they extend fore and aft therefrom and have sufficient lateral spacing to accommodate therebetween linking segments 44. Segments 43 and linking segments 44 alternate with each other in a longitudinal series and are pivotally secured together near their respective ends by means of pivot bolts 45. Longitudinal linkages 42 are pivotally secured to the supporting frame by means of lug plates 28 which are secured to the underside of frontal member 12 and outboard frontal member 14 (as the case may be) so as to extend downwardly in laterally spaced pairs in whch the spacing is sufficient to accommodate therebetween a linking member 46 which is somewhat longer than a linking segment 44 but otherwise similar thereto. Pivot bolt 29 connects the forward end of linking member 46 to lub plates 28.

Beams 31 are fastened to the undersides of frontal member 12 and cross member 13 in the case of inboard section 10, and to the underside of outboard frontal member 14 and outboard cross member 15 in the case of outboard sections 30, and extend longitudinally between the supporting frame and the working frame. Beams 31 serve as spacers between the respective segments of the supporting and working frames, such as when the device is resting on the ground (note FIG. 4).

Figure 5:
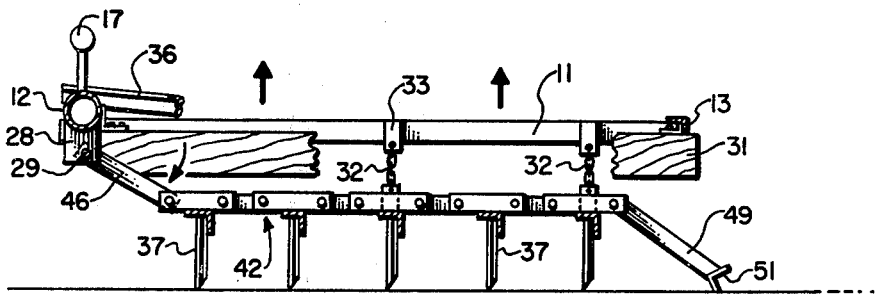
FIG. 5 is a vertical section, partly broken away, also taken along line 4—4 of FIG. 2 but in this case depicting the parts in fully extended vertical position such as occurs upon application of an uplifting force to the overlying frame of the device.
Figure 6:
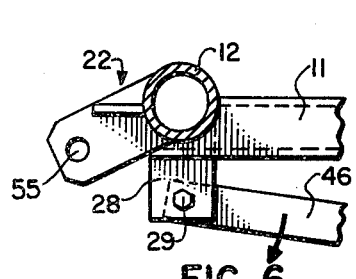
FIG. 6 is a vertical fragmentary section taken along line 6—6 of FIG. 2.
Figure 7:
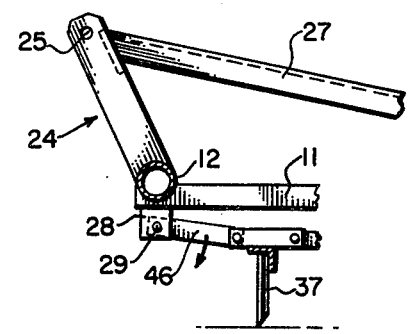
FIG. 7 is a vertical fragmentary section taken along line 7—7 of FIG. 2.

Short lengths of chain 32 fastened by means of lugs 33 and 34 flexibly connect the upper portions of alternate harrow bars 41 and 61 (as the case may be) to the overlying longitudinal members 11 so that the working sections 40 and 60 are independently and flexibly supported below their corresponding supporting sections 10 and 30 (note FIG. 5). And by virtue of the linkaging utilized in longitudinal linkages 42, each of the harrow bars 41 and 61 is free to undergo independent vertical and pivotal motion with respect to the other such harrow bars.

Harrow teeth 37 extend downwardly from harrow bars 41 and 61 for working and conditioning the soil. FIGS. 8A and 8B illustrate particularly suitable configuration and positioning of such teeth, as well as a convenient mode by which they can be secured to harrow bars 41 and 61. Although not essential, drag bars 51 are provided to the rear of each of the sections for smoothing out the soil to the rear of the harrow. Drag bars 51 are pivotally secured to the rearward ends of longitudinal linkages 42 by means of linking members 49.

In fabricating the harrow of this invention it is convenient and economical to use iron or other ferrous metal parts whereever strength, durability and/or rigidity is desired, although other structural materials may be found suitable. In the case of beams 31, wood is a convenient construction material although here again a range of materials (e.g., metals, plastics, etc.) are available from which a selection may be made. Welding is a particularly convenient method for establishing permanent rigid connections between ferrous metal parts, but if desired other methods of attachment may be utilized, such as use of adhesives, appropriately designed fastening members, and the like. All such details of construction are well within the purview of the art and will be readily apparent to those skilled in the art.

It will be understood that certain features and subcombinations referred to herein are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A harrow device characterized by including
   (i) a supporting frame adapted to be connected to a draft source, said supporting frame having a plurality of laterally positioned rigid supporting sections, each hinged to its laterally adjacent section, said supporting frame being composed of an inboard section and two outboard sections, one of which is on each side of the inboard section;
   (ii) a plurality of working sections corresponding to the respective supporting sections, said working sections each comprising
      (a) a plurality of tandemly positioned elongated transverse harrow bars secured together for independent vertical and pivotal motion with respect to each other, and
      (b) a plurality of downwardly disposed harrow teeth secured to said harrow bars;
   (iii) connecting means flexibly securing the working sections to their corresponding supporting sections so that when a working section is in harrowing position it underlies its corresponding supporting section;
   (iv) first fluid actuated driving means connected between one of the outboard sections of the supporting frame and the inboard section of the supporting frame, and second fluid actuated driving means connected between the other outboard section of the supporting frame and the inboard section of the supporting frame so that each one of the outboard supporting sections together with its corresponding working section can be independently rotated as a unit around a longitudinal axis between prone and upstanding positions;
   (v) butt plates positioned between and carried by the respective laterally adjacent sections of the supporting frame, said butt plates being in registration when the supporting frame is in prone position; said driving means of (iv) being adapted to force and maintain said butt plates in registration when the supporting frame is in prone position and at other preselected times to effect the rotation of the outboard section of the supporting frame and its corresponding outboard working section as specified in (iv);
   (vi) individual spacer means mounted on the undersides of the respective supporting sections so that each spacer means is interposed between a supporting section and its corresponding working section, said spacer means separating the supporting section from its underlying working section by a predetermined distance when the harrow device rests in prone position upon a flat surface; and
   (vii) attachment means mounted on the forward end of the inboard section of the supporting frame enabling the entire supporting frame to be detachably attached to and propelled by the draft source and to be raised and lowered by and tilted forwardly and rearwardly by driving means of the draft source;
   the connecting means of (iii) being further characterized in that they are linearly extendible to a predetermined length such that when the supporting frame is raised by driving means of the draft source, working sections in prone positon can be suspended below their corresponding supporting sections by a predetermined distance substantially in excess of the predetermined distance of (vi).

2. A device according to claim 1 wherein each section of the supporting frame and its corresponding section of the working frame are secured together by a plurality of said flexible connecting means.

3. A device according to claim 1 wherein said attachment means include on the lower forward end of the inboard section of the supporting frame means for pivotally attaching said section to the draft source, and on the upper forward end of said section attachment means for receiving a linear extendible/retractable driving means mounted on the draft source so that the entire harrow device can be rotated around a transverse axis in proximity to the lower forward end of the device.

* * * * *